(12) United States Patent
Kessler

(10) Patent No.: US 6,838,841 B2
(45) Date of Patent: Jan. 4, 2005

(54) METHOD FOR CONTROLLING AN ELECTRONICALLY COMMUTATED DC MOTOR

(75) Inventor: Martin Kessler, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 10/296,658

(22) PCT Filed: Jan. 29, 2002

(86) PCT No.: PCT/DE02/00281

§ 371 (c)(1),
(2), (4) Date: Jun. 9, 2003

(87) PCT Pub. No.: WO02/080348

PCT Pub. Date: Oct. 10, 2002

(65) Prior Publication Data

US 2003/0190161 A1 Oct. 9, 2003

(30) Foreign Application Priority Data

Mar. 30, 2001 (DE) .......................... 101 15 873

(51) Int. Cl.$^7$ ................................ H02P 6/08
(52) U.S. Cl. ................ 318/254; 318/268; 318/724
(58) Field of Search ................ 318/138, 254, 318/268, 439, 720–724

(56) References Cited

U.S. PATENT DOCUMENTS

| | | | |
|---|---|---|---|
| 3,794,931 A | * 2/1974 | Albrecht et al. ............ | 330/279 |
| 4,527,102 A | 7/1985 | Gotou ....................... | 318/254 |
| 5,296,789 A | 3/1994 | Ohi ........................... | 318/254 |
| 5,457,366 A | 10/1995 | Wehberg et al. ............ | 318/439 |
| 6,191,966 B1 | * 2/2001 | Yu ............................ | 363/98 |
| 6,333,610 B1 | 12/2001 | Meschik et al. ............ | 318/254 |
| 6,362,582 B1 | 3/2002 | Bernauer et al. ........... | 318/254 |
| 6,362,590 B2 | * 3/2002 | Nozari ....................... | 318/609 |
| 6,556,461 B1 | * 4/2003 | Khersonsky et al. ......... | 363/41 |

FOREIGN PATENT DOCUMENTS

| | | |
|---|---|---|
| DE | 43 10 260 | 9/1994 |
| DE | 198 15 896 | 10/1999 |
| JP | 07 300011 | 11/1995 |
| WO | WO 98 58442 | 12/1998 |

OTHER PUBLICATIONS

Patent Abstracts of Japan vol. 1996 No. 3, Mar. 29, 1996 & JP 07 300011 A (Calsonic Corp), Nov. 14, 1995 Abstract.

* cited by examiner

Primary Examiner—Bentsu Ro
(74) Attorney, Agent, or Firm—Kenyon & Kenyon

(57) ABSTRACT

A method of controlling an electronically commutated DC motor having a multiphase stator winding which has an even number m of winding phases which are each connected in series with a controllable semiconductor switch, parallel to one another, in which in a lower power output range of the DC motor the semiconductor switches are cycled using a pulse control factor which is predefinable as a function of the rpm within the consecutive periods when the individual winding phases are energized. To reduce the maximum power losses in the semiconductor switches, a setpoint pulse control factor required for a setpoint rpm is achieved within a selected setting range of the pulse control factor by alternatingly setting a comparatively greater pulse control factor and a comparatively lower pulse control factor, and the setting of the two pulse control factors is varied over time so that a voltage setting the setpoint rpm is set across the stator winding on the average over time.

14 Claims, 3 Drawing Sheets

METHOD FOR CONTROLLING AN ELECTRONICALLY COMMUTATED DC MOTOR

FIELD OF THE INVENTION

The present invention is directed at a method of controlling an electronically commutated DC motor.

BACKGROUND INFORMATION

In an electronic control circuit for an electronically commutated DC motor (EC motor) having a three-phase stator winding and a permanent magnet-excited rotor as referred to in German Published Patent Application No. 43 10 260, three semiconductor switches configured as MOS FETs are each connected in series with a winding phase of the stator winding, and the three series circuits are connected in parallel. The control terminals of the semiconductor switches receive commutating signal-triggered control signals, which depend on the rotor position, so that the semiconductor switches may be triggered using a current flow angle, definable by the length of the control signals, within the commutating angle (block control). In order to avoid undesired features of block control in the lower rpm range (occurrence of high current peaks at low motor speeds and noisy operation), in a lower rpm segment at 100% triggering, the amplitude of the control signal is increased with increasing rpm up to a first rpm (linear control), then with increasing rpm up to a second rpm the amplitude of the control signals is increased to a maximum and at the same time the degree of triggering of the current flow angle (block length) is reduced from 100% to a lower value. Then, starting at the second rpm, with increasing rpm up to the maximum rpm, the degree of triggering is increased again from the lower value to 100% with maximum amplitude of the control signals. The pure block control in the upper rpm range may avoid the lower efficiency, which may be inherent in linear control.

In variable-speed EC motors, also known as brushless DC motors, there are motor topologies where the power loss in the semiconductor switches does not increase with the motor output, but rather is higher in the partial load range than in the full load range. This may be undesirable in particular for drives whose intrinsic cooling increases with increased power output of the DC motor, such as for example in pump motors, which are cooled by the medium pumped. Such motor topologies may be encountered, for example, in EC motors having a single-strand or multistrand, even-numbered multiphase winding, for example, a double-strand four-phase winding or a three-strand six-phase winding. These EC motors may be controlled in cycled operation by pulse-width (PW) modulation. With increased pulse control factor of the cycle, i.e., switched-on time of the semiconductor switch in relation to the cycle length, the power losses in the semiconductor switches increase more than proportionally, so that such EC motors are not operated in the cyclic mode in the upper motor output range, and the motor output is changed by varying the block length via the block control. In this case, the time periods in which the individual winding phases are energized increasingly overlap. In this type of control, the maximum power loss in the semiconductor switches may occur shortly before the transition from cycled operation to block operation.

SUMMARY OF THE INVENTION

An exemplary method according to the present invention may provide that certain pulse control factors required for the desired rpm, which cause a high power loss in the semiconductor switches may be avoided, and the setpoint rpm may be achieved by varying, over time, those pulse control factors which cause lower power losses in the semiconductor switches. In this manner the maximum losses in the semiconductor switches may be effectively reduced in the partial load range, and the efficiency of the DC motor may be improved. This may result in reduced cooling requirements for the semiconductor switches, for which smaller heat sinks may now be sufficient, which in turn may result in space and cost savings.

The exemplary method according to the present invention may require no additional hardware. All control measures affecting the commutating signals may be implemented by software modules using the existing hardware. Overall, the exemplary method according to the present invention may result in increased efficiency and reduced cost in the manufacturing of the EC motors in question.

According to one exemplary embodiment of the exemplary method, the smaller and greater pulse control factors may be selected so that the power loss in the semiconductor switches is lower with these pulse control factors than the power loss occurring at the setpoint pulse control factor. The setpoint pulse control factor may be achieved by alternating between the two pulse control factors, the frequency of alternation between the pulse control factors being adjusted to the configuration characteristics of the DC motor, for example, its moment of inertia. Thus, the two pulse control factors may be set consecutively while a winding phase is energized, or the two pulse control factors may be switched after half of an electrical turn, a full turn, or multiple turns of the motor.

DETAILED DESCRIPTION

Figure 1:
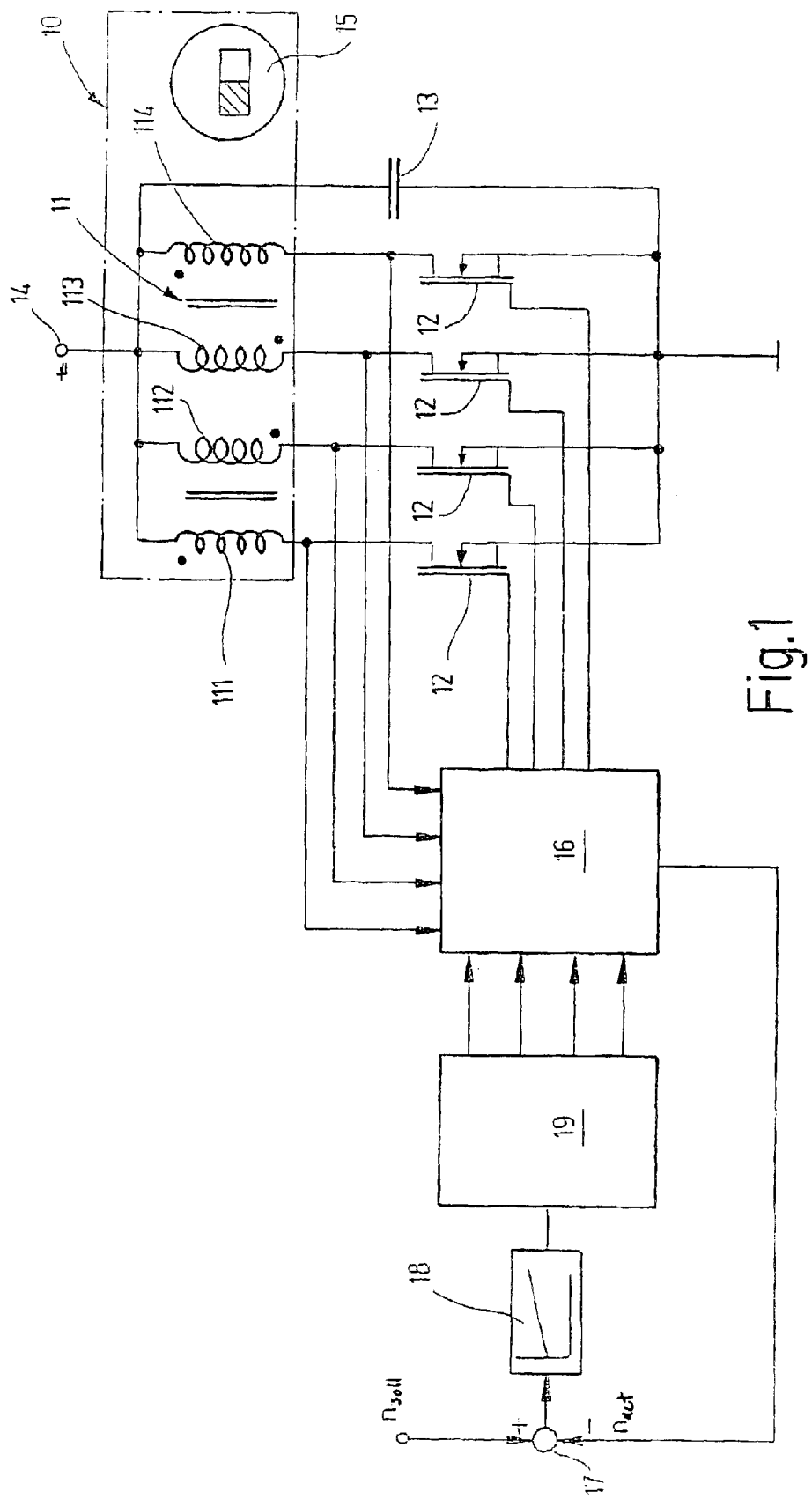
FIG. 1 shows a block diagram of an EC motor having an electronic control.

In the exemplary embodiment illustrated in FIG. 1 as a block diagram for elucidating the exemplary method according to the present invention, an electronically commutated DC motor, referred to hereinafter as EC motor 10, is set, i.e., regulated at a predefinable setpoint rpm $n_{setp}$. EC motor 10 has a two-strand, multiphase stator winding 11 having an even-numbered m, here m=4, winding phases 111–114 and a rotor 15 excited by a permanent magnet. Winding phases 111 and 112, as well as 113 and 114 of each winding strand are wound in opposite directions and inductively coupled. Each of winding phases 111–114 is connected in series with a semiconductor switch 12, which is configured in this case as a MOS-FET. The four series circuits each composed of one of winding phases 111–114 and one semiconductor switch 12, together with a capacitor 13, are connected into a parallel circuit, which is connected to a DC system 14, the point of common coupling of the four winding phases 111–114 being connected to the positive pole of DC system 14 and the point of common coupling of semiconductor switches 12 being connected to frame potential.

Winding phases 111–114 are also connected to a commutating device 16, in which the voltages induced in winding phases 111–114 are further processed. Furthermore, in commutating device 16, an rpm signal is generated from the induced voltages which corresponds to actual rpm $n_{act}$ of EC motor 10 and is applied as an rpm-proportional DC signal to a comparator 17, configured for example as a differential amplifier and which also receives setpoint rpm $n_{setp}$. Comparator 17 compares setpoint rpm $n_{setp}$ and actual rpm $n_{act}$, and the difference is supplied to an rpm regulator 18. The regulator output signal is applied to the input of a pulse width modulator 19. Pulse width modulator 19 generates a separate control pulse train for each winding phase 111–114; these control pulse trains are gated with the commutating signals in commutation device 16. Semiconductor switches 12 of the individual winding phases 111–114 are triggered by the control signals obtained from these logic operations, so that each semiconductor switch 12 is cycled with an rpm-dependent pulse control factor when energized. The cycling of semiconductor switches 12 determines the magnitude of the direct voltage applied to EC motor 10, i.e., its stator winding 11, and the rpm is varied by varying this voltage; the nominal torque may be fully taken into account at all rpm levels.

In an EC motor 10 thus controlled, the power loss of semiconductor switches 12 increases with increasing pulse control factor, i.e., pulse width divided by the pulse period, in other words, with increasing pulse width modulation. Therefore, the motor control via pulse width modulation is restricted to the lower half of the output power spectrum in cycled operation, and in the upper half the motor output is varied by block control, specifically by increasing the angle where each winding phase is energized beyond the commutating angle. In the exemplary embodiment of the four-phase EC motor according to FIG. 1, the commutating angle is 90 electrical degrees. The control mode is switched for semiconductor switches 12 at an rpm $n_b$ that is much less than the idling rpm, which is achieved using a 100% pulse width modulation when the winding is energized over an angle of 90 electrical degrees.

Figure 2:
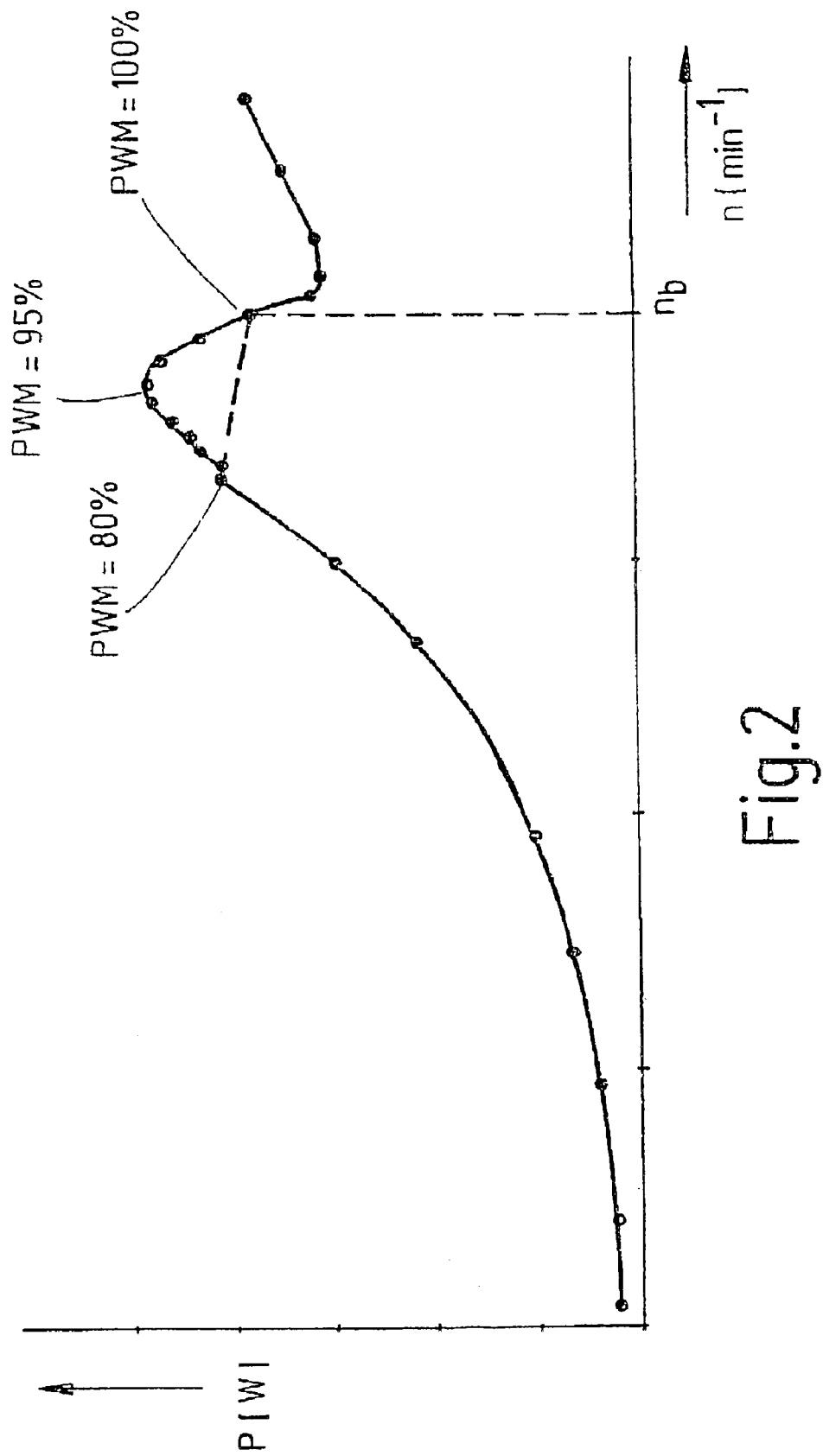
FIG. 2 shows a diagram of the power loss of the semiconductor switches in the EC motor as a function of the EC motor rpm.

FIG. 2 shows power loss P of semiconductor switches 12 as a function of rpm n of EC motor 10. It may be seen that power loss P increases suddenly shortly before reaching rpm $n_b$, i.e., shortly before the transition from cycled control to block control. In the example of FIG. 2, the maximum power loss P occurs at a pulse control factor or pulse width modulation of 95%. In order to reduce this power loss and thus to improve the efficiency of EC motor 10, the following control method may be used in pulse-width modulator 19 for generating the control signals for semiconductor switches 12:

A certain set range of pulse control factors, in which the power loss in semiconductor switches 12 exceeds a predefined value at any pulse control factor, is selected within the pulse control factors that may be produced by pulse width modulator 19. In the example of FIG. 2, this set range is selected between a pulse width modulation or pulse control factor of 80% and a pulse width modulation or pulse control factor of 100%. For these two pulse width modulations or pulse control factors, the power loss in semiconductor switches 12 is about the same, while in the range of pulse width modulations or pulse control factors in between the power loss of semiconductor switches 12 always assumes a higher value. If a setpoint pulse control factor which is located in this selected range is required due to a required setpoint rpm $n_{setp}$, i.e., in the example between a pulse width modulation or pulse control factor of 80% and a pulse width modulation or pulse control factor of 100%, a greater and a smaller pulse control factor is set compared to this setpoint pulse control factor, both of which are located outside the selected set range, and the two pulse control factors are varied over time so that a voltage which corresponds to the voltage produced using the setpoint pulse control factor and which controls the rpm at setpoint rpm $n_{setp}$ is obtained across stator winding 11 on the average over time. For example, the smaller pulse control factor is set at 80% and the greater pulse control factor is set at 100%, and the setting is varied as appropriate over time. The frequency of variation between the two pulse control factors is adjusted to the configuration characteristics of EC motor 10, e.g., its moment of inertia, and the variation may be performed in different ways.

Figure 3:
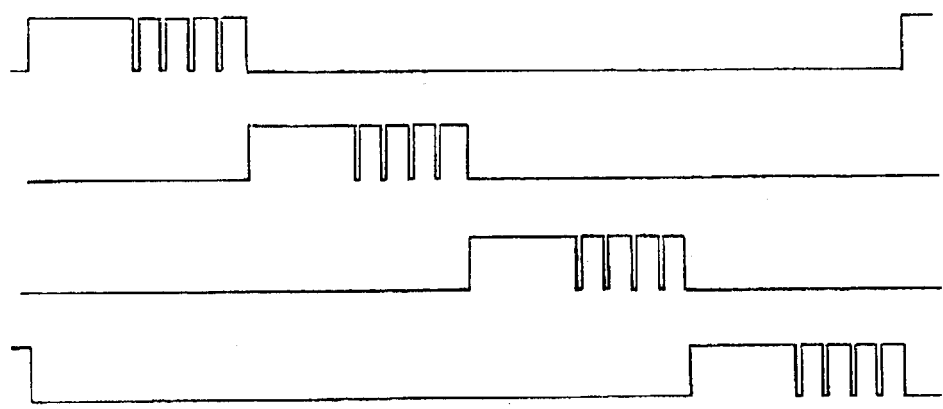
FIG. 3 shows a diagram of the control signals for the semiconductor switches in each winding phase for three different control modes.
Figure 3:
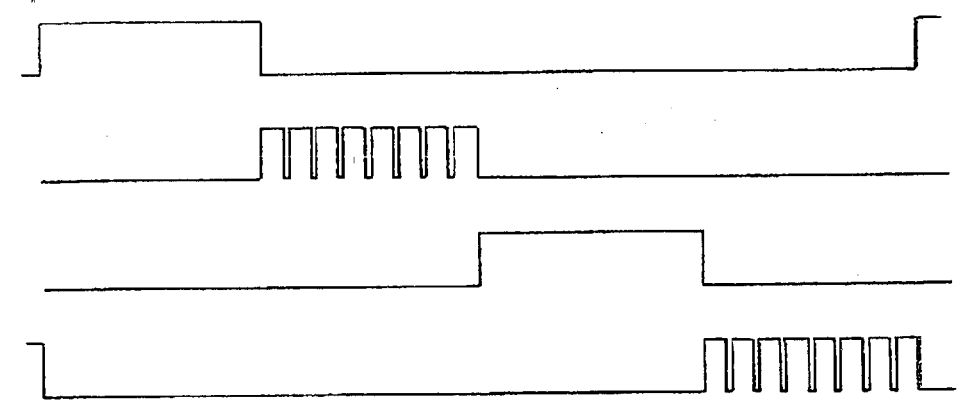
Figure 3:
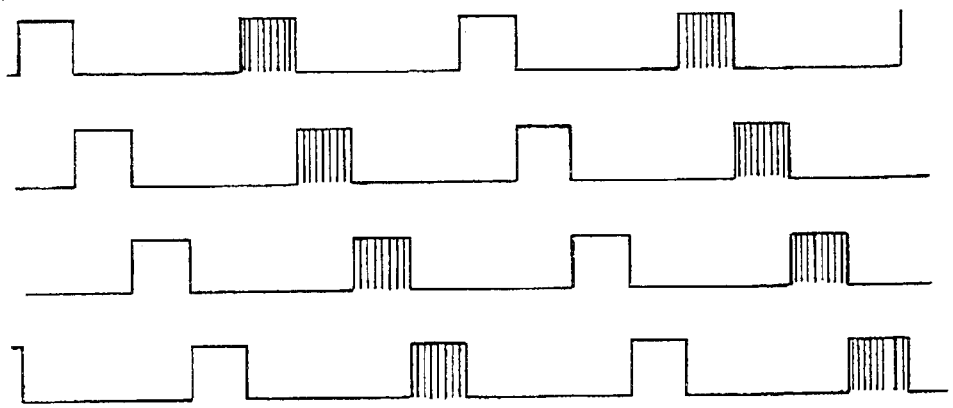

In order to achieve an average voltage across stator winding 11, which may require a pulse width modulation or pulse control factor of 90% and may set the desired setpoint rpm $n_{setp}$, FIG. 3 shows three different options for varying the two pulse control factors. In all three examples, the smaller pulse control factor is 80% and the greater pulse control factor is 100%. FIGS. 3a and 3b show, for each winding phase 111–114, one period of a commutating signal which is applied to the respective semiconductor switch 12 during one 360 electrical degrees revolution of rotor 15. FIG. 3c shows a plurality of periods of the commutating signals.

In the example of FIG. 3a, the setting of the two pulse control factors is varied so that the reciprocal value of the frequency of variation between the two pulse control factors corresponds to the energized time period of a winding phase 111–114, i.e., the time during which a winding phase 111–114 is energized (during a revolution of rotor 15 by 360 electrical degrees), the 100% pulse control factor and the 80% pulse control factor are consecutively set, so that each semiconductor switch 12 in a winding phase 111–114 is cycled with a fictitious pulse control factor of 90% on the average, while the resulting power loss in semiconductor switches 12 is merely the average power loss between the substantially lower power losses at a pulse control factor of 80% and a pulse control factor of 100%. The energized time of a winding phase 111–114 is calculated from the constant energized angle of winding phase 111–114 which for the assumed four-phase winding 11 amounts to 360 electrical degrees divided by four, i.e., 90 electrical degrees, taking into account the rpm of EC motor 10. For example, if a setpoint rpm $n_{setp}$ is to be set which requires a voltage across EC motor 10 which is to be set using a pulse control factor or a pulse width modulation of 95% and would result in the maximum power loss in semiconductor switches 12, then within the energizing time of individual winding phase 111–114, the time segment in which the respective semiconductor switch 12 is triggered using the lower pulse control factor of 80% is reduced accordingly, so that on average a fictitious pulse control factor of 95% is obtained. As the broken line in the diagram of FIG. 2 shows, the increased power loss in the range between a pulse control factor of 80% and a pulse control factor of 100% is considerably reduced and does not exceed the power loss produced at a pulse control factor of 80% in semiconductor switches 12.

In the example of FIG. 3b, the setting of the two pulse control factors of 80% and 100% is varied so that the reciprocal value of the frequency of variation between the two pulse control factors corresponds to half a revolution of EC motor 10. Thus, winding phases 111 and 113 are triggered using a pulse control factor of 100%, and phases 112 and 114 are triggered using a pulse control factor of 80%, so that on the average a fictitious pulse control factor of 90% is obtained, whereby the power loss is reduced as described above. A fictitious pulse control factor of 95% may be achieved, for example, by cycling winding phases 111, 112, and 113 using a pulse control factor of 100%, and winding phase 114 using a pulse control factor of 80%. The power loss thus obtained corresponds on the average to a power loss obtained at a pulse control factor of 80% or a pulse control factor of 100% and may thus be considerably lower than the power loss that would be obtained with a pulse control factor of 95%.

In the example of FIG. 3c, the setting of the 80% pulse control factor and of the 100% pulse control factor is varied in order to achieve a fictitious pulse control factor of 90% so that the reciprocal value of the frequency of variation between the two pulse control factors corresponds to a full electrical revolution of EC motor 10. In this case, in successive revolutions of EC motor 10 each winding phase 111–114 is triggered alternatingly with a pulse control factor of 100% and a pulse control factor of 80%.

The reciprocal value of the frequency of variation between the two pulse control factors 80% and 100% may, however, also correspond to a multiple of an electrical revolution of EC motor 10. Thus, for example, each winding phase 111–114 may be triggered with a pulse control factor of 100% during two electrical revolutions and with a pulse control factor of 80% during a third electrical revolution. On the average, triggering with a fictitious pulse control factor of 95% would result, which would still produce a lower power loss in semiconductor switches 12 than by triggering each semiconductor switch 12 with the actual pulse control factor of 95%.

The present invention is not limited to the above-described exemplary embodiment of a double-strand, four-phase EC motor 10. The same control method also may be used, for example, for an EC motor having a three-strand, six-phase stator winding, in which likewise the winding phases of a winding strand, wound in opposite directions, are inductively coupled and therefore have the motor topology as described above for EC motor 10.

What is claimed is:

1. A method of controlling an electronically commutated DC motor, the method comprising:

providing a multiphase stator winding having an even number of winding phases parallel to one another;

connecting each of the winding phases in series with one of a plurality of controllable semiconductor switches;

cycling the plurality of controllable semiconductor switches in a lower output range of the electronically commutated DC motor using a pulse control factor, which is predefinable as a function of a rpm, within consecutive periods when individual ones of the winding phases are energized; and achieving a setpoint pulse control factor required for a setpoint rpm within a selected set range of the pulse control factor by alternating between setting a first pulse control factor that is greater than the setpoint pulse control factor and a second pulse control factor that is smaller than the setpoint pulse control factor, the setting of the first and second pulse control factors being varied over time so that a voltage that regulates the rpm at the setpoint rpm is set across the stator winding as an average over time.

2. The method of claim 1, wherein the first and second pulse control factors are selected so that a power loss in the controllable semiconductor switches at the first and second pulse control factors is less than the power loss obtained at the setpoint pulse control factor.

3. The method of claim 1, wherein the selected set range of the pulse control factor is a range in which a power loss obtained in the controllable semiconductor switches for each pulse control factor exceeds a predefined value.

4. The method of claim 1, wherein a pulse control factor of 100% is selected as the first pulse control factor at which a switched-on time of the controllable semiconductor switches is equal to a switching period.

5. The method of claim 3, wherein a pulse control factor of 80% is selected as the second pulse control factor at which a switched-on time of the controllable semiconductor switches is equal to 80% of a switching period.

6. The method of claim 1, wherein a frequency of variation between the first and second pulse control factors is adjusted to configuration characteristics of the electronically commutated DC motor.

7. The method of claim 6, wherein the configuration characteristics include a moment of inertia.

8. The method of claim 6, wherein a reciprocal value of the frequency of variation between the first and second pulse control factors corresponds to a time during which a winding phase is energized.

9. The method of claim 8, wherein each of the first and second pulse control factors occurs at least once for an energizing time segment appropriately defined, during the time when the winding phase is energized within an electrical revolution of the electronically commutated DC motor.

10. The method of claim 6, wherein a reciprocal value of the frequency of variation between the first and second pulse control factors corresponds to one-half of an electrical revolution of the electronically commutated DC motor.

11. The method of claim 10, wherein the pulse control factor is varied in consecutive winding phases during an electrical revolution of the electronically commutated DC motor.

12. The method of claim 6, wherein a reciprocal value of the frequency of variation between the first and second pulse control factors corresponds to at least one electrical revolution of the electronically commutated DC motor.

13. The method of claim 12, wherein each of the first and second pulse control factors are maintained unchanged in all winding phases during an electrical revolution of the electronically commutated DC motor, and the pulse control factor is varied in each nth electrical revolution, n being an integer one of equal to and greater than 2.

14. The method of claim 13, further comprising:

deriving a time during which the winding phases are energized from an energized angle that is calculated by dividing 360 electrical degrees by the even number of winding phases and that is constant in each winding phase, taking into account a motor rpm.

* * * * *